(12) United States Patent  
Seo et al.

(10) Patent No.: US 9,520,818 B2
(45) Date of Patent: Dec. 13, 2016

(54) METHOD FOR DRIVING EMERGENCY GENERATOR USING ENERGY STORAGE SYSTEM

(71) Applicant: HYOSUNG CORPORATION, Seoul (KR)

(72) Inventors: Young Ger Seo, Seoul (KR); Jeong Min Lee, Seoul (KR); Jin Hee Lee, Gyeonggi-do (KR)

(73) Assignee: HYOSUNG CORPORATION, Seoul (KR)

( * ) Notice: Subject to any disclaimer, the term of this patent is extended or adjusted under 35 U.S.C. 154(b) by 12 days.

(21) Appl. No.: 14/417,689

(22) PCT Filed: Jul. 29, 2013

(86) PCT No.: PCT/KR2013/006785
§ 371 (c)(1),
(2) Date: Jan. 27, 2015

(87) PCT Pub. No.: WO2014/017881
PCT Pub. Date: Jan. 30, 2014

(65) Prior Publication Data
US 2015/0288307 A1 Oct. 8, 2015

(30) Foreign Application Priority Data
Jul. 27, 2012 (KR) .................. 10-2012-0082737

(51) Int. Cl.
*H02P 11/00* (2006.01)
*H02H 7/06* (2006.01)
(Continued)

(52) U.S. Cl.
CPC . *H02P 9/02* (2013.01); *H02J 3/06* (2013.01); *H02J 9/06* (2013.01)

(58) Field of Classification Search
USPC ............................................ 322/36; 290/1 A
See application file for complete search history.

(56) References Cited

U.S. PATENT DOCUMENTS 5,515,937 A * 5/1996 Adler ....................... B60H 1/04
180/65.245
5,778,675 A * 7/1998 Nakhamkin ............... F02C 6/16
60/39.17

(Continued)

FOREIGN PATENT DOCUMENTS

JP 2010-142076 A 6/2010
KR 10-2006-0065881 A 6/2006

(Continued)

*Primary Examiner* — Pedro J Cuevas
(74) *Attorney, Agent, or Firm* — Novick, Kim & Lee, PLLC; Jae Youn Kim

(57) ABSTRACT

The present invention relates to a method for driving an emergency generator using an energy storage system in which, when the power of an emergency generator is applied, an energy storage system is allowed to handle the load demand, thereby driving the emergency generator at maximum efficiency. For this purpose, the method for driving an emergency generator using an energy storage system (ESS), including, after an emergency generator has been applied and until the emergency generator reaches a preset maximum efficiency driving state, handling, by an ESS, load demand using previously stored power, and, when the emergency generator reaches the preset maximum efficiency driving state, maintaining the driving of the emergency generator in the maximum efficiency driving state.

5 Claims, 4 Drawing Sheets

(51) Int. Cl.
*H02P 9/00* (2006.01)
*H02P 9/02* (2006.01)
*H02J 9/06* (2006.01)
*H02J 3/06* (2006.01)
*F02B 63/04* (2006.01)
*H02K 7/18* (2006.01)

(56) References Cited

U.S. PATENT DOCUMENTS

| | | | | |
|---|---|---|---|---|
| 6,470,985 B1* | 10/2002 | Inada | ............... | B60K 6/46 180/309 |
| 7,034,414 B1* | 4/2006 | Foerg | ............... | H02J 9/06 290/1 A |
| 7,400,052 B1* | 7/2008 | Badger | ............... | H02J 15/00 290/1 A |
| 7,629,699 B2* | 12/2009 | Annen | ............... | H02K 7/1884 290/1 A |
| 7,642,664 B1* | 1/2010 | Andrews | ............... | H02J 3/30 290/1 A |
| 9,351,353 B2* | 5/2016 | Recker | ............... | H02J 9/02 |
| 9,367,825 B2* | 6/2016 | Steven | ............... | G06Q 10/00 |
| 2007/0158945 A1* | 7/2007 | Annen | ............... | H02K 7/1884 290/1 A |
| 2014/0163756 A1* | 6/2014 | Idrees | ............... | H02J 3/32 700/291 |
| 2014/0188689 A1* | 7/2014 | Kalsi | ............... | G06Q 40/04 705/37 |
| 2015/0048622 A1* | 2/2015 | Schegerin | ............... | F03G 3/00 290/1 R |
| 2015/0274022 A1* | 10/2015 | Nakasako | ............... | H02P 9/04 290/45 |
| 2015/0280480 A1* | 10/2015 | Mitri | ............... | H02J 7/0068 307/22 |
| 2016/0087687 A1* | 3/2016 | Kesler | ............... | H04B 5/0037 307/104 |
| 2016/0123296 A1* | 5/2016 | Hanna | ............... | F03B 13/10 290/43 |
| 2016/0141879 A1* | 5/2016 | Motsenbocker | ............... | H02J 3/383 307/18 |
| 2016/0180474 A1* | 6/2016 | Steven | ............... | G06Q 10/06314 705/7.24 |
| 2016/0190805 A1* | 6/2016 | Steven | ............... | H02J 3/00 700/291 |
| 2016/0190867 A1* | 6/2016 | Ginart | ............... | H02J 9/061 307/67 |
| 2016/0204606 A1* | 7/2016 | Matan | ............... | G05B 15/02 700/291 |
| 2016/0204610 A1* | 7/2016 | Matan | ............... | G05B 15/02 700/287 |

FOREIGN PATENT DOCUMENTS

| | | |
|---|---|---|
| KR | 10-2011-0074370 A | 6/2011 |
| KR | 10-2012-0080018 A | 7/2012 |

\* cited by examiner

METHOD FOR DRIVING EMERGENCY GENERATOR USING ENERGY STORAGE SYSTEM

TECHNICAL FIELD

The present invention relates to a method for driving an emergency generator and, more particularly, to a method for driving an emergency generator using an energy storage system in which, when the power of an emergency generator is applied, an energy storage system is allowed to handle the load demand, thereby driving the emergency generator at maximum efficiency.

BACKGROUND ART

In general, in a power supply system, an emergency power source, such as a power generator, is separately provided in order to prepare for the case where a problem occurs in a normal power supply source. An emergency generator supplies alternative power in order to prevent an interruption to the supply of power when the supply of commercial power is shut off along with an uninterruptible power supply (UPS) for short-period compensation.

Such an emergency generator selectively connects power supply-requiring loads selected from among the loads of a system. This is intended to selectively connect loads in order to connect loads in accordance with preset specifications for the amount of generated power of the emergency generator when the emergency generator applies power in the case where an emergency, such as a power failure, occurs.

As described above, in the conventional technology, when the power of the emergency generator is applied, loads are connected in accordance with specifications and thus the supply of power to some loads is cut off, so that a problem arises in that a power failure situation occurs in the loads.

In particular, in order to prevent a power failure state in some loads, an emergency generator should be driven at the power generation capacity that satisfies all load demand within a system.

In this case, since the corresponding power generation capacity should be maintained regardless of a variation (reduction) in the load demand, problems arises in that the driving efficiency of the emergency generator is degraded and economic efficiency is lowered, and a negative influence is exerted upon the lifespan of the emergency generator.

DISCLOSURE

Technical Problem

Accordingly, the present invention is proposed to overcome the above problems occurring in the conventional technology, and an object of the present invention is to provide a method for driving an emergency generator using an energy storage system, which allows an energy storage system to handle the load demand, thereby enabling an emergency generator to be driven at preset optimum efficiency.

Furthermore, another object of the present invention is to provide a method for driving an emergency generator using an energy storage system, which allows surplus power attributable to a reduction in the load demand to be stored in an energy storage system during the optimum efficiency driving of an emergency generator.

Technical Solution

In order to accomplish the above objects, the present invention provides a method for driving an emergency generator using an energy storage system (ESS), including:

after an emergency generator has been applied and until the emergency generator reaches a preset maximum efficiency driving state, handling, by an ESS, load demand using previously stored power; and when the emergency generator reaches the preset maximum efficiency driving state, maintaining the driving of the emergency generator in the maximum efficiency driving state.

The connected state between the emergency generator and one or more loads may be continuously maintained.

Handling, by the ESS, the load demand may include, if the amount of generated power of the emergency generator is smaller than the load demand, supplying at least an amount of power equal to or larger than the difference between the amount of generated power and the load demand to one or more loads using the power previously stored in the ESS.

Handling, by the ESS, the load demand may include, if the amount of generated power of the emergency generator is larger than the load demand, storing surplus power, attributable to the amount of generated power, in the ESS.

Advantageous Effects

The method for driving an emergency generator using an ESS according to the present invention, which is configured as described above, has the following effects:

First, in the present invention, when the power of the emergency generator is applied, it is not necessary to selectively cut the connection of loads in accordance with specifications, so that a power failure situation can be prevented from occurring in some loads.

Furthermore, in the present invention, the load demand is handled by the ESS, so that the emergency generator can be always driven at optimum efficiency.

Moreover, in the present invention, when surplus power is generated during the optimum efficiency driving of the emergency generator, the surplus power can be stored in the ESS, so that the amount of power wasted can be minimized.

MODE FOR INVENTION

The present invention will be described in detail below based on preferred embodiments of the present invention with reference to the accompanying diagrams. In the description of the present invention, a detailed description of a related well-known function or configuration will be omitted if it is determined that the detailed description may unnecessarily make the gist of the present invention obscure.

Figure 1:
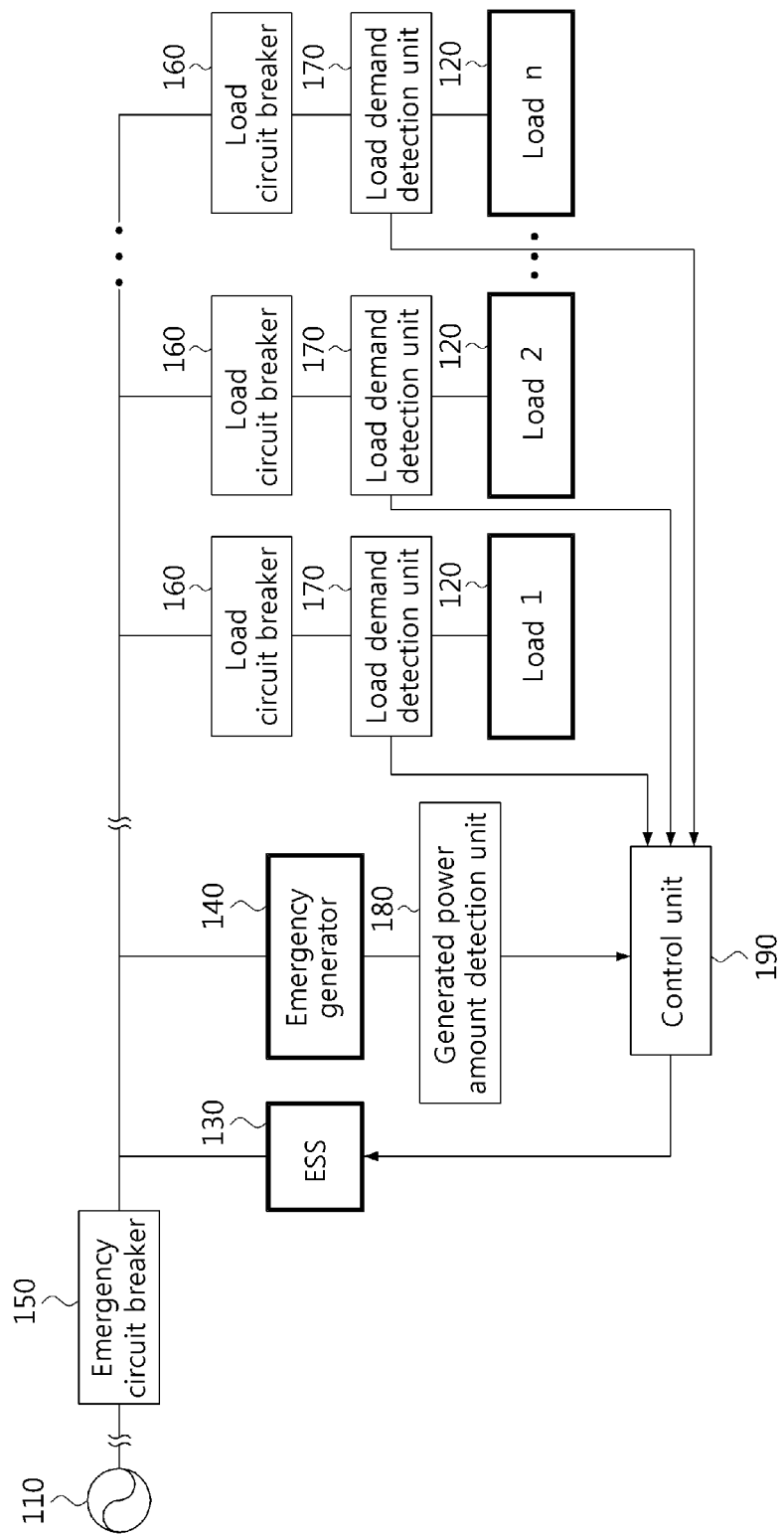
FIG. 1 is a system diagram of a power supply system to which an emergency generator according to the present invention has been applied.

FIG. 1 is a system diagram of a power supply system to which an emergency generator according to the present invention has been applied.

Referring to FIG. 1, in the power supply system according to the present invention, an emergency energy system (ESS) 130 and an emergency generator 140 are installed between a commercial power source 110 and a plurality of loads 120. An emergency circuit breaker 150 is installed downstream of the commercial power source 110, and a load circuit breaker 160 is installed upstream of each of the loads 120. The load demand of the loads 120 is detected by load demand detection units 170, and the amount of generated power of the emergency generator 140 is detected by the generated power amount detection unit 180. The amount of generated power and load demand detected as described above are input to a control unit 190.

In a normal state, the emergency circuit breaker 150 is maintained in a connected state, i.e., an initial state, thereby allowing power to be supplied from the commercial power source 110 to the plurality of loads 120. When the supply of power is shut off due to the failure, malfunction or the like of the commercial power source 110 and thus a power failure occurs, the emergency circuit breaker 150 is switched and cuts off the connection between the commercial power source 110 and the loads 120 and, at the same time, the emergency generator 140 is applied and allows its generated power to be supplied to the plurality of loads 120.

In this case, the emergency generator 140 has been set such that it is driven in accordance with preset specifications, and thus the amount of generated power thereof does not satisfy the load demand of all the loads 120 when the emergency generator 140 is applied. The difference between the amount of generated power and the load demand is compensated for by the ESS 130. That is, at least an amount of power equal to or larger than the difference between the amount of generated power of the emergency generator 140 and the load demand of the loads 120 is supplied to the plurality of loads 120 using power previously stored in the ESS 130.

In this case, the core characteristic of the present invention is that the emergency generator 140 is driven at maximum efficiency. The maximum driving efficiency of the emergency generator 140 is one of the unique characteristics of the emergency generator 140, and each emergency generator 140 has a preset value for the maximum driving efficiency. Accordingly, in the present invention, during the period from the time at which the emergency generator 140 is applied due to the occurrence of a power failure to the time at which the emergency generator 140 reaches a preset maximum efficiency driving state, if the amount of generated power of the emergency generator 140 is smaller than the load demand, at least an amount of power equal to or larger than the difference between the amount of generated power and the load demand is supplied to the plurality of loads 20 using power previously stored in the ESS 130. Thereafter, when the emergency generator 140 reaches the maximum efficiency driving state, the maximum efficiency driving state is continuously maintained.

In this case, after the emergency generator 140 has been applied, all the load circuit breakers 160 are continuously maintained in a connected state in order to ensure the supply of power between the emergency generator 140 and the loads 120. Accordingly, power is supplied to all the loads 120, and thus a power failure situation is prevented from occurring.

Meanwhile, if the amount of generated power of the emergency generator 140 is larger than the load demand, the remainder obtained by subtracting the load demand from the amount of generated power, i.e., surplus power, is stored in the ESS 130. This allows power related to power insufficient for the load demand to be supplied by the ESS 130 if the load demand is larger than the amount of generated power until or while the emergency generator 140 is driven at maximum efficiency, and, in contrast, allows surplus power to be stored in the ESS 130 if the amount of generated power is larger than the load demand. Accordingly, both the advantage of driving the emergency generator 140 at maximum efficiency and the economic befit of storing surplus power can be achieved.

Figure 2:
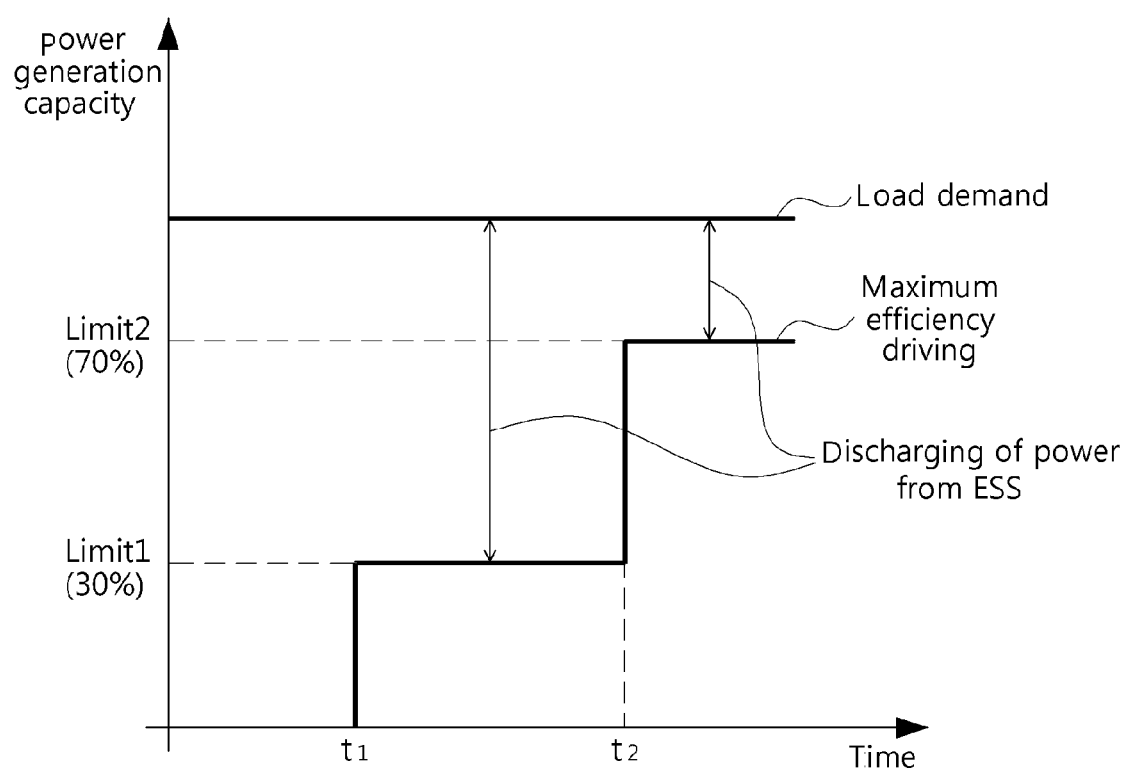
FIG. 2 is a time chart regarding supplied power using an emergency generator and an energy storage system according to an embodiment of the present invention.

FIG. 2 is a time chart regarding supplied power using an emergency generator and an ESS according to an embodiment of the present invention, which illustrates the case where the amount of generated power of the emergency generator 140 is smaller than the load demand of the loads 120.

Referring to FIG. 2, when the emergency generator 140 is applied, the generation of power is started. In this case, the emergency generator 140 is driven at an efficiency of 30% (Limt1) during a specific period from time t1 to time t2 in accordance with preset specifications. Thereafter, the emergency generator 140 is driven at an efficiency of 70% from time t2 (Limit2), in which case the driving efficiency becomes maximum efficiency. It will be apparent that the percentages "30%" and "70%" illustrated in FIG. 2 are merely examples presented for ease of description and they may be set to difference values depending on the specifications of the emergency generator 140. Accordingly, when the emergency generator 140 is applied in case of emergency, it performs stepwise power generation in accordance with its own specifications. In the conventional technology, since the amount of generated power is smaller than the load demand at each step, some of a plurality of loads are selectively disconnected, and thus a power failure situation occurs in some loads. In contrast, in the present invention, the ESS 130 discharges previously stored power for insufficient power related to the amount of generated power, as illustrated in the drawing, and thus power is supplied to all the loads 120 without the occurrence of a power failure situation. Accordingly, immediately after the emergency generator 140 has been applied, the load demand can be adjusted by the ESS 130.

In this case, as illustrated in the drawing, in the present invention, even when the amount of generated power is smaller than the load demand, it is important to maintain the driving of the emergency generator 140 at maximum efficiency (e.g., 70%), rather than increasing the amount of generated power by maximally driving the emergency generator 140. In other words, although the amount of generated power may be adjusted to the load demand by maximally driving the emergency generator 140, the emergency generator 140 is driven at only an efficiency of 70% in the present invention. This is enabled because the ESS 130 supplies power for insufficient power. In this case, the maximum efficiency driving of the emergency generator 140 refers to driving in the state in which the efficiency of the emergency generator 140 is highest. In some cases, this may be also construed as optimum efficiency. This maximum efficiency driving state is previously set for each emergency generator 140 upon the manufacturing of the emergency generator 140, and becomes a characteristic value unique to each emergency generator.

Figure 3:
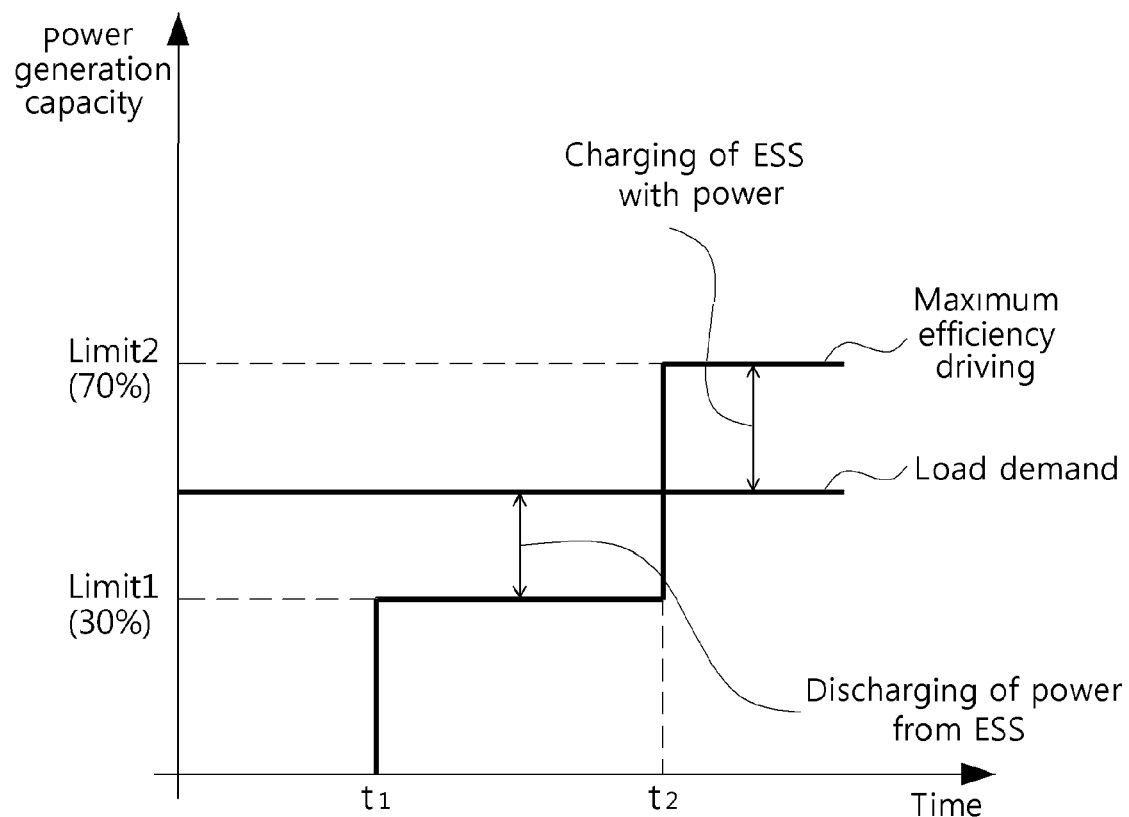
FIG. 3 is a flowchart illustrating a method for driving an emergency generator using an ESS according to the present invention.

FIG. 3 is a time chart regarding supplied power using an emergency generator and an ESS according to another embodiment of the present invention, which illustrates the case where the amount of generated power of the emergency generator 140 is smaller than the load demand of the loads 120, unlike in the case of FIG. 2. As illustrated in FIG. 2, the emergency generator 140 performs stepwise power generation in accordance with its own specifications. During an initial specific period from time t1 to time t2, the amount of generated power of the emergency generator 140 is smaller than the load demand, and thus the ESS 130 supplies power for insufficient power to the loads 120. In contrast, when the maximum efficiency driving state of the emergency generator 140 is reached after time t2, the amount of generated power is larger than the load demand, and thus surplus power corresponding to the difference therebetween is stored in the ESS 130. This allows the ESS 130 to charge (store) surplus power, relatively increase the load demand and thus increase the amount of generated power to a maximum efficiency driving state so that the emergency generator 140 can be driven at maximum efficiency.

In this case, as illustrated in the drawing, in the present invention, if the amount of generated power is larger than the load demand, it is important to maintain the driving of the emergency generator 140 at maximum efficiency (e.g., 70%), rather than decreasing the amount of generated power to the load demand. In other words, although the amount of generated power may be adjusted to the load demand, the emergency generator 140 is driven at only an efficiency of 70% in the present invention. This is performed in order to enable the maximum efficiency driving of the emergency generator 140. In particular, this is enabled because there is the ESS 130 capable of storing the remaining surplus power obtained by subtracting the load demand from the amount of generated power.

Figure 4:
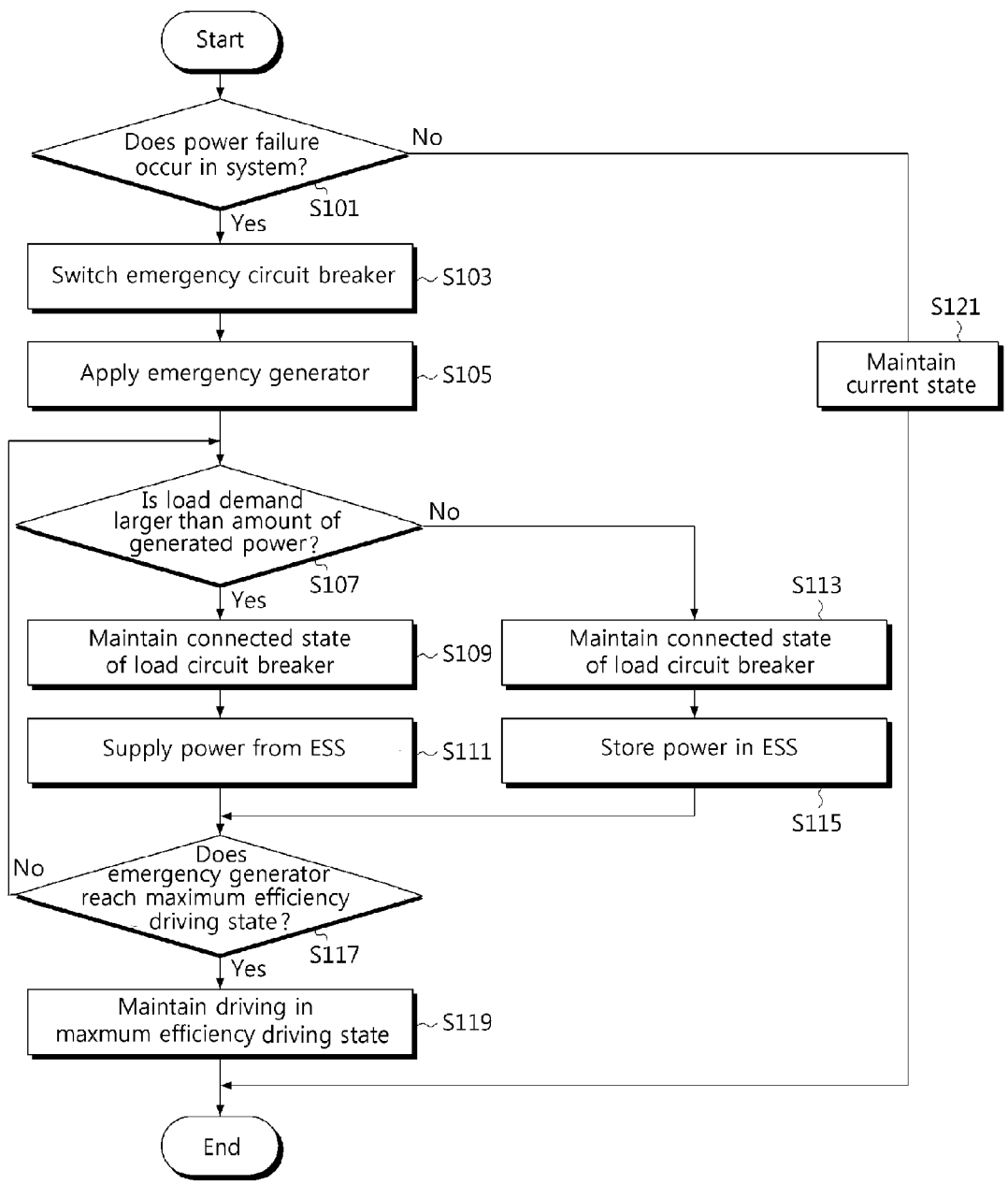
FIG. 4 is a flowchart illustrating a method for driving an emergency generator using an ESS according to the present invention.

FIG. 4 is a flowchart illustrating a method for driving an emergency generator using an ESS according to the present invention.

Referring to FIG. 4, when a power failure occurs in a system at step S101, the emergency circuit breaker 150 is switched at step S103 and the emergency generator 140 is immediately applied at step S105. When the emergency generator 140 is applied, the emergency generator 140 performs driving until a maximum efficiency driving state is reached while increasing the amount of generated power in a stepwise manner in accordance with preset specifications.

Thereafter, if the load demand of the loads 120 is larger than the amount of generated power of the emergency generator 140 at step S107, the connected state of the load circuit breakers 160 installed upstream of the respective loads 120 is continuously maintained at step S109, and an amount of power corresponding to the difference between the amount of generated power and the load demand is supplied by the ESS 130 at step S111. In this case, the ESS 130 preferably supplies at least an amount of power equal to or larger than the difference therebetween to the loads 120 using previously stored power.

If the load demand of the loads 120 is smaller than the amount of generated power of the emergency generator 140 at step S107, the connected state of the load circuit breakers 160 installed upstream of the respective loads 120 is continuously maintained at step S1113, and an amount of power corresponding to the difference between the amount of generated power and the load demand is stored in the ESS 130 at step S115. This operation is continuously performed until the emergency generator 140 reaches the maximum efficiency driving state.

Thereafter, when the emergency generator 140 reaches a maximum efficiency driving state at step S117, the driving thereof is continuously maintained in the maximum efficiency driving state at step S119.

As described above, in the present invention, during the period from the time at which the emergency generator 140 is applied to the time at which the emergency generator 140 reaches a preset maximum efficiency driving state, if the amount of generated power of the emergency generator 140 is smaller than the load demand, at least an amount of power equal to or larger than the difference between the amount of generated power and the load demand is supplied to the loads 20 using power previously stored in the ESS 130. Thereafter, when the emergency generator 140 reaches a maximum efficiency driving state, the driving thereof is continuously maintained in the maximum efficiency driving state. Furthermore, if the amount of generated power is larger than the load demand in the maximum efficiency driving state of the emergency generator 140, surplus power is stored in the ESS 130.

Therefore, the embodiment of the present invention is advantageous in that the ESS 130 is employed, so that the extension of the lifespan of the emergency generator and the improvement of driving efficiency can be achieved because the driving of the emergency generator 140 is maintained in a maximum efficiency driving state, and so that a power failure situation, which occurs in some loads in the conventional technology, can be prevented and also the waste of power can be minimized.

Although the present invention has been described in detail via the preferred embodiments, it should be noted that the present invention is not limited to the embodiments. It will be readily apparent to those having ordinary knowledge in the technical field to which the present invention pertains that various changes and modifications, which are not presented in the embodiments, can be made to the present invention within the scope of the attached claims and fall within the range of technical protection of the present invention. Accordingly, the true range of technical protection of the present invention should be determined based on the technical spirit of the attached claims.

INDUSTRIAL APPLICABILITY

An emergency generator is an apparatus for supplying alternative power when the supply of commercial power is shut off, and plays a very important role in a power supply system. Since a power failure situation in an industrial site or a critical facility causes a serious loss, the maintenance of the emergency generator is very important. In particular, since such an emergency generator requires high replacement costs, it is important to ensure a stable lifespan via efficient driving.

As a result, the method for driving an emergency generator according to the present invention can perform long-term driving because a power failure situation is prevented from occurring in loads connected to the emergency generator and driving is performed at optimum efficiency, and can be very usefully used in a power supply system because the surplus power of the emergency generator can be stored in a separate device.

The invention claimed is:

1. A method for driving an emergency generator using an energy storage system (ESS) in a power supply system, in which the ESS and the emergency generator are installed between a commercial power source and a plurality of loads, comprising the following steps:

applying the emergency generator when a supply of power is shut off;

driving the emergency generator at a preset maximum driving efficiency even though an amount of generated power of the emergency generator is smaller or larger than a load demand; and maintaining driving of the emergency generator in a maximum efficiency driving state, although the load demand is variable while driving the emergency generator at the preset maximum driving efficiency, wherein the ESS handles an amount of power corresponding to a difference between the variable load demand and the amount of power generated by the emergency generator.

2. The method of claim 1, wherein after the emergency generator has been applied, a connected state between the emergency generator and one or more loads is continuously maintained.

3. The method of claim 1, wherein handling, by the ESS, the load demand comprises, if an amount of generated power of the emergency generator is smaller than the load demand, supplying at least an amount of power equal to or larger than a difference between the amount of generated power and the load demand to one or more loads using the power previously stored in the ESS.

4. The method of claim 1, wherein handling, by the ESS, the load demand comprises, if an amount of generated power of the emergency generator is larger than the load demand, storing surplus power, attributable to the amount of generated power, in the ESS.

5. The method of claim 3, wherein handling, by the ESS, the load demand comprises, if an amount of generated power of the emergency generator is larger than the load demand, storing surplus power, attributable to the amount of generated power, in the ESS.

* * * * *